March 13, 1956 G. H. TABER 2,737,728
APPARATUS FOR DETERMINING WHEEL ALIGNMENT AND COMPARATIVE
STEERING ANGLES OF VEHICLE WHEELS
Filed May 28, 1952 3 Sheets-Sheet 1
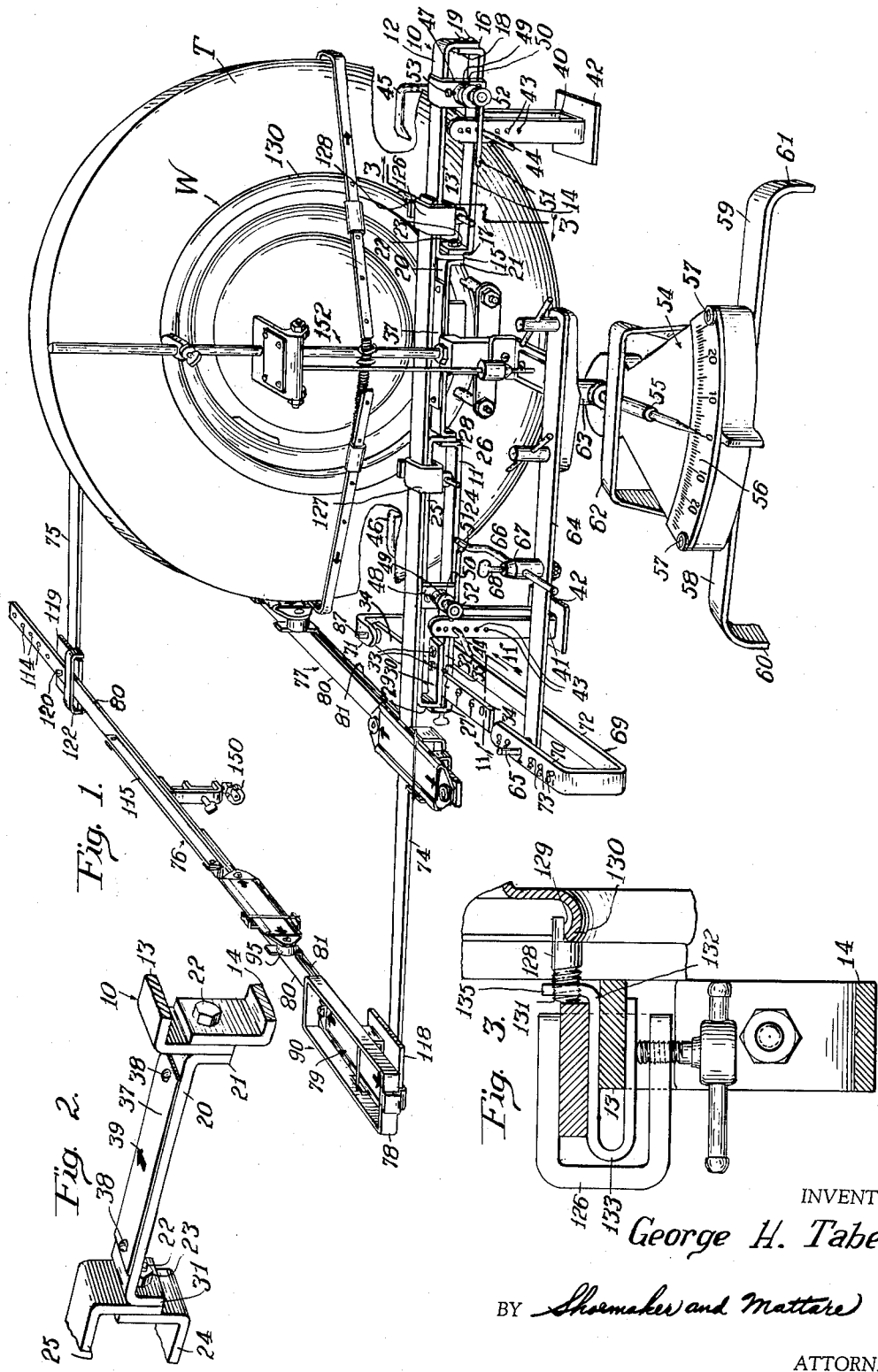
INVENTOR
*George H. Taber*
BY *Shoemaker and Mattare*
ATTORNEYS

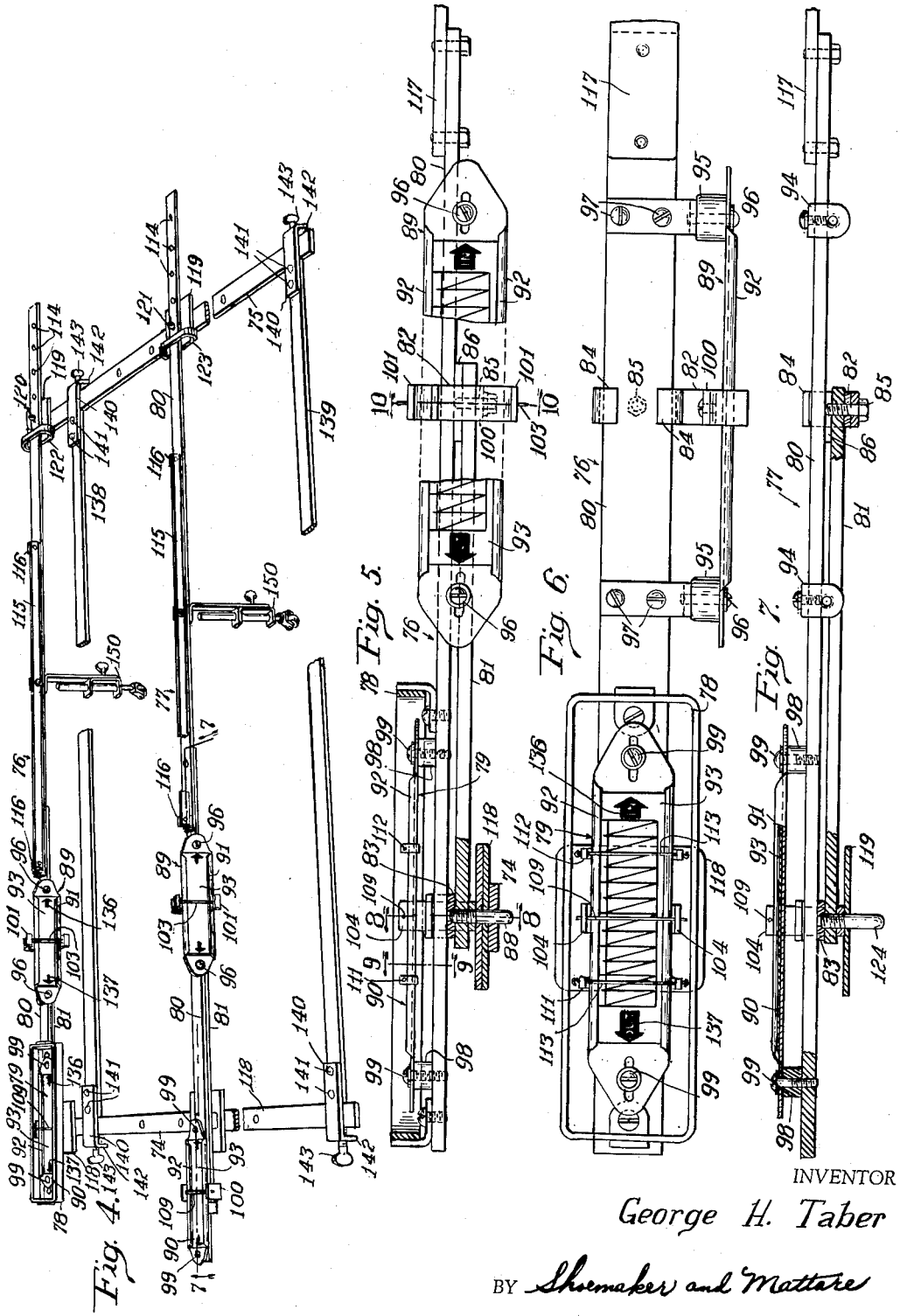

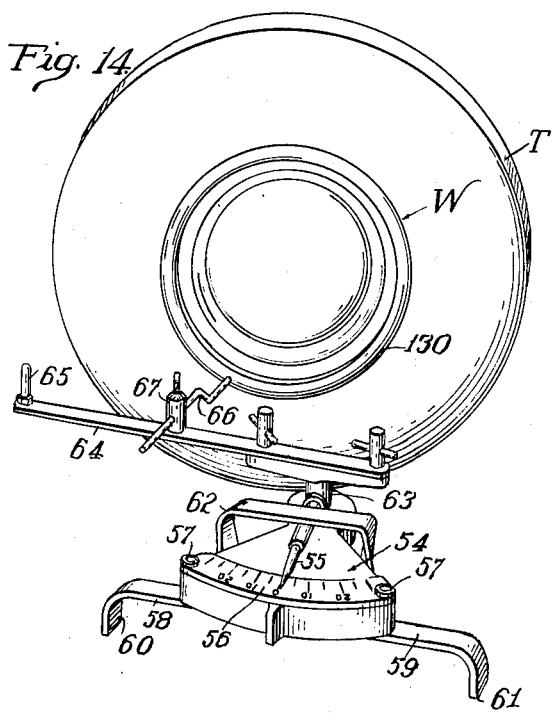
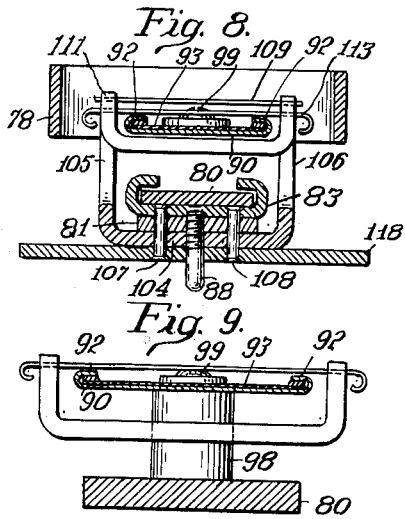
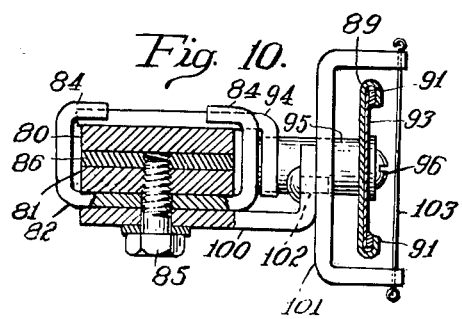
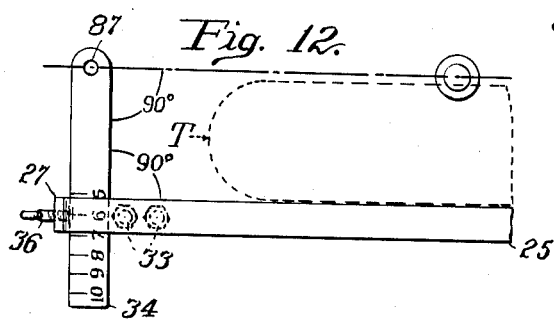
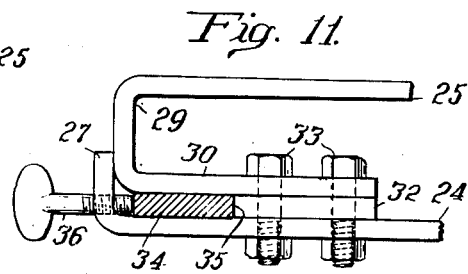
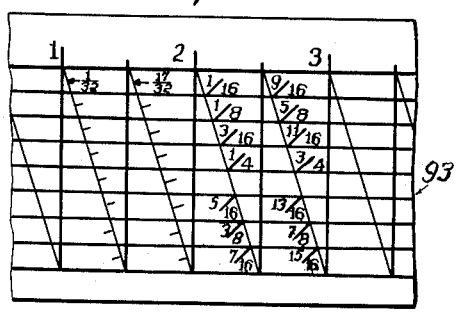
INVENTOR
George H. Taber
BY Shoemaker and Mattare
ATTORNEYS United States Patent Office 2,737,728
Patented Mar. 13, 1956

2,737,728

APPARATUS FOR DETERMINING WHEEL ALIGNMENT AND COMPARATIVE STEERING ANGLES OF VEHICLE WHEELS

George H. Taber, Elmira, N. Y.

Application May 28, 1952, Serial No. 290,416

9 Claims. (Cl. 33—203.2)

The present invention relates to improvements in vehicle alignment apparati and more particularly to improvements in indicating devices useful in testing and correcting vehicle wheel alignment.

Correct wheel alignment may be defined by the law that determines proper alignment. That law, in order to provide for the highest degree of steering efficiency for the two front steering wheels of an automotive vehicle, decrees that the axis of each of the two front wheels must be in true parallel relation to the level supporting surface for the two wheels, and the axis of each front wheel must be set to a perpendicular relation to the straight-ahead direction of the forward travel of the vehicle. When the wheels are not in accordance with that law, the result is faulty steering and needless tire wear.

Excessive wear and strain of the tires and steering mechanism can be eliminated by proper wheel alignment. However, heretofore, alignment indicating devices employed in the correction of misalignment have proved unsatisfactory in that substantial errors in indications have occurred as a result of the manner in which the prior indicating devices have been attached to the vehicle or wheels. Further error has occurred as a result of the limited accuracy with which readings as to the state of alignment can be taken.

An object of the present invention is to provide an improved apparatus for indicating the state of alignment of the steering wheels of a vehicle, and wherein the indications of misalignment are amplified to facilitate correction thereof to a greater degree of accuracy than heretofore has been possible.

Another object of the present invention is to provide indicating apparatus for use in aligning and steering wheels of vehicles, wherein first and second indicating means are provided and so related to the steering wheels and spindle bolts therefor as to indicate the degree of misalignment and the amount of toe-in or toe-out of the wheels.

Still another object of the present invention is to provide an improved means for indicating steering angles and wherein the means includes a pointer indicator laterally displaced from the steering wheel to be tested and a parallel linkage interconnecting the steering wheel with the pointer so as to indicate the angular position of the steering wheel about its spindle bolt.

A still further object of the present invention is to provide an improved wheel alignment indicating apparatus wherein the apparatus is mounted on the steering wheels and is fixed relative to the tire rim rather than to the tire on the rim so as to obviate inaccuracies normally incident to defective or unevenly worn tires.

A further object of the present invention is to provide an improved vehicle wheel alignment indicating apparatus having first and second indicating means such that when the apparatus is applied to an alignment problem, the readings of the indicators of the apparatus are alike when showing correct alignment and the readings of the indicators are dissimilar when showing incorrect alignment, and the difference between the readings of the indicators at any one time is indicative of the degree of toe-in or toe-out, whereby a mechanic can effect correction of the misalignment and toe-in or toe-out by adjustment while checking the indicators until similar readings are achieved.

Another object of the present invention is to provide each of the first and second indicating means with dual indicators, one lying in a vertical plane for observation by the mechanic beneath the vehicle being aligned and the other of the dual indicators being disposed in a horizontal plane for observation by the mechanic or car owner while standing adjacent the alignment apparaus of the present invention.

Other objects of the present invention are to provide such improved support means for mounting the alignment indicating apparatus in substantially perpendicular planar relationship to the planes of the tire rim beads of the steering wheels, and to provide alignment apparati of simplified construction which can be readily employed by mechanics when correcting the alignment of vehicle wheels, and which apparatus obviates the necessity of employing any apparatus which requires supporting the steering wheels in raised relation to the supporting surface or moving the vehicle backwardly and forwardly.

Various other objects and advantages such as the inexpensiveness of manufacture and simplicity in use, will become apparent from the detailed description to follow. The best form in which I have contemplated applying my invention is clearly illustrated in the drawings wherein:

Fig. 1 is a perspective view of the invention as applied to a vehicle, showing the attachment to one of the steering wheels;

Fig. 2 is a perspective view of a portion of the master support frame, showing the pointer adapted to be aligned with the plane through the wheel centers;

Fig. 3 is a view in cross section taken on line 3—3 of Fig. 1;

Fig. 4 is a view in perspective of the alignment indicating assembly showing the removable preadjusting spacer means applied thereto;

Fig. 5 is a side elevational view of the first or prime indicating assembly, parts in section and parts being broken away;

Fig. 6 is a top plan view of the first or prime indicating assembly with part broken away;

Fig. 7 is a vertical sectional view taken substantially along the plane of line 7—7 of Fig. 4;

Fig. 8 is a transverse vertical sectional view taken substantially along the plane of line 8—8 of Fig. 5;

Fig. 9 is a transverse vertical sectional view taken substantially along the plane of line 9—9 of Fig. 5;

Fig. 10 is a transverse vertical sectional view taken substantially along the plane of line 10—10 of Fig. 5;

Fig. 11 is a longitudinal vertical sectional view taken substantially along the plane of line 11—11 of Fig. 1, showing the manner in which the slide bar of the parallel linkage for the steering degree indicator is mounted on the support assembly;

Fig. 12 is a plan view showing the vehicle wheel in dotted lines and showing the relationship between the spindle bolt and the support frame and slide bar;

Fig. 13 is an enlarged view of a portion of one of the indicator charts; and

Fig. 14 is a perspective view showing the steering angle indicating device as applied to a wheel, to indicate wheel run out.

In the embodiment of my invention shown in the accompanying drawings, by way of example, it will be understood that a pair of the steering angle indicators, one associated with each of the steering wheels of a vehicle, is contemplated for actual practice. The steering angle indicators are operated by a parallel linkage system attached to main support frames in a manner to be described in detail hereinafter. The main support frames are rigidly connected to the steering wheels during the alignment procedure, and have the parallel linkages operatively associated therewith. The main support frames in addition carry elongated bars which project forwardly of the vehicle.

At the free ends of the elongated bars and carried thereby is a first or prime indicating assembly and placed intermediately of this assembly and the steering wheels is the second or sub indicating assembly.

Generally the first and second or the prime and sub indicating assemblies are of the same structure and include first and second extensible means having first and second indicating means respectively carried thereby for indicating the correct relationship between the forwardly extending bars when the steering wheels are in their straight-ahead position and in proper alignment, and indicating the degree of toe-in or toe-out of the wheels when out of alignment. The first and second means each broadly includes a pair of telescopically associated bars provided with indicating means to indicate the relationship between the bars.

Looking now at Fig. 1, it will be understood that since the assembly for the right wheel, not shown, is identical to that of the left wheel, it is necessary to describe only the structure as applied to one of the steering wheels and assume that the right wheel is provided with a complementary apparatus.

The main support frame or assembly designated generally by the numeral 10 is comprised of elongate spaced aligned end sections or frames 11 and 12 joined or connected by the intermediate spacer bar 20. The end section 12 is comprised of upper and lower angulated bars 13 and 14 which have right angular end portions 15, 16 and 17, 18. These bars provide parallel upper and lower contact edges for abutment against the side wall of a tire in mounting the assembly for use, in the manner hereinafter set forth. The angular portions 15 and 16 of the upper bar overlie the right angular portions 17 and 18 of the lower bar and are rigidly fastened at the outer end by rivets 19 or the like and at the opposite end to the downturned end 21 of spacer bar 20 by the bolt 22 and nut 23, as seen best in Fig. 2. The opposing end section 11 is constructed of two bars 24 and 25 of which the lower bar 24 has right angular end portions 26 and 27 and the upper bar 25 is provided at one end with a right angular portion 28. The other end of the bar 25 is bent downward as at 29 and inward as at 30. The end 26 overlies the end 28 and together they are fastened to the downturned end 31 of the spacer bar 20 by a bolt 22 and nut 23, again referring to Fig. 2. The turned up end 27 of the lower bar 24 overlies the angular portion 29 of the upper bar 25 and the inturned end 30 is separated from bar 24 by a spacer 32. Bolts 33 are engaged through apertures in the inturned end 30, bar 24 and spacer 32 to hold the same together. A graduated slide bar 34 is transversely slidably engaged in the opening 35 and adjustably held in position by a thumb screw 36 threaded in an opening formed through turned-up end 27.

The intermediate spacer bar 20 has a plate 37 secured thereto by screws 38 and is provided with an indicia arrow 39 the purpose of which will be described hereinafter.

The main frame supporting elements 40 and 41 are U-shaped and each has a foot 42 secured to the lower end thereof and a series of holes 43 are provided in the supporting elements for receiving pins 44 therethrough for the purpose of supporting the opposing ends 11 and 12 of each support assembly.

The main frame 10 is clamped to the tire T of the steering wheel W by means of claws 45 and 46. Screw threaded shank extensions of the claws pass through the end sections of the main frame and are received through apertures in the slide carriers 47 and 48. Each slide carrier is comprised of a U-shaped bracket slidably embracing one of the end portions 11 or 12. The threaded shank of the claw passing through the carrier 47 or 48 has a washer 49 and a knurled, thumb tightening nut 50 is engaged on the threaded shank and bears against the slide carrier to draw the claw end into clamping engagement with the tire T. The shank extension has a claw relator rod 51 mounted thereon by means of the sleeve 52. The claw relator rod is positioned in the same plane as the claw and is held in that position by means of a set screw 53 in the sleeve 52. It will thus be seen that the claw can be engaged with a point on the inside surface of the tire opposite the portion of the tire between the upper and lower bars of the opposing ends of the support assembly for stability purposes.

In order to accurately indicate the degree of turn of each wheel, I provide a steering angle indicator 54, triangular in shape, which has a pointer 55 pivoted at the apex of the triangle and overlying the arcuate scale 56 attached by the screws 57. The scale segment is laid off in degrees on either side of the center, at which point is the zero marking indicating a straight-ahead condition of the vehicle steering wheels. The indicator is supported on the floor by a pair of front legs 58 and 59 downturned at their ends 60 and 61, and by a single rear leg, not visible, so as to maintain the indicator horizontally disposed. I have also provided a handle 62 for convenience in moving the indicator to the desired relationship with the wheel. The pointer has a substantially T-shaped element 63 upstanding therefrom to which is rigidly secured an actuating arm 64. The free end of actuating arm 64 is provided with an upstanding dowel pin 65. An adjustable angulated contact rod 66 is pivotally carried by the post 67 on and intermediate the ends of actuating arm 64 and held in adjusted position by the thumb screw 68. The elongated connecting link 69 is a bar bent back as at 70 and 71 in spaced parallel relation to the main portion 72. The portion 71 at the inner end is provided with an aperture to receive the dowel pin 87 on the slide bar 34. The outer portion 70 of the link 69 is elongated and contains a series of apertures 73 through any one of which may pass the dowel pin 65 of actuating arm 64, depending primarily upon the size of the tire.

In Fig. 1, the wheel alignment indicating assembly is shown as comprising two elongated bars 74 and 75. The bars 74 and 75 are interconnected at the extreme ends by a first or prime indicating assembly designated generally by the numeral 76 and intermediate their ends by a second or sub indicating assembly 77. The first and second or prime and sub indicating assemblies are substantially similar with the exception of a guard 78 which protects the outermost indicator 79 of the prime indicating assembly. Therefore, it will only be necessary to describe one of these indicating assemblies in detail.

Looking now at Figs. 4 through 7 which disclose the preferred form of my prime and sub indicating assemblies, it will be seen that I provide a two-piece bar 80 bridging the free ends of the elongated bars 74 and 75 and a second bar 81 of substantially shorter length. The bars 80 and 81 are relatively slidable and maintained in alignment by means of the guides 82 and 83. Guide 82 is substantially U-shaped (see Fig. 10) with the base of the U passing under bar 81 and having the upper free ends thereof bent in as at 84 to partially encompass bar 80. A threaded bolt 85 passes through an aperture in guide 82 and engages bar 81 and passes through an intermediate spacer 86. Guide 83 is similar to guide 81 and is attached to the upper surface of bar 81 by the threaded end of dowel pin 88.

Each indicating assembly is provided with a vertical measuring chart holder 89 (see Fig. 10) and a horizontal chart holder 90 (see Fig. 9). These chart holders are thin plates with rolled side edges 91 and 92 forming channels for receiving a measuring chart card 93. Chart holder 89 is supported at either end on bar 80 by L-shaped brackets 94 and studs 95. Suitable screws 96 fasten the chart holder to the L-brackets 94 and the L-brackets are securely held by machine screws 97 to bar 80. Horizontal chart holder 79 is spaced from the surface of bar 80 by studs 98 (see Fig. 7) and held to the bar 80 by screws 99. An indicator pointer for chart holder 89, comprising members 100, 101, suitably secured together as at 102, is attached to bar 81 by bolt 85. See Fig. 10. The ends of the member 101 extend outwardly of the measuring chart holder 89 and support an indicator wire 103. I have also provided an indicator pointer 104 for chart holder 90 substantially U-shaped with the base of the U passing under bar 81 and the legs 105 and 106 extending upwardly above the surface of chart holder 79. The indicator 104 is rigidly attached to bar 81 by the threaded end of dowel pin 88 and by rivets 107 and 108, as clearly shown in Fig. 8. A wire pointer 109 is held in tension between legs 105 and 106 just above the surface of chart holder 90. Chart holder 90 is provided with adjustable indicators 111 and 112 on either side of indicator assembly 104. Indicators 111 and 112 (see Fig. 9) are bows having an indicator wire 113 stretched between angular end portions, with chart holder 90 passing between the wire and bow. The indicator wire rests on the surface of chart holder 90 suspending the bow beneath it. There is sufficient friction between wire 113 and chart holder 90 to maintain the indicator at a pre-set position.

Bar 80 of both the prime and sub indicating assemblies has a series of apertures 114 for pivotal attachment to bar 75. The indicating assemblies are strengthened throughout a portion of their length by rigidifying members 115 and are supported at the proper height by adjustable caster brackets 150. Bar 80 is constructed in two sections connected as at 117 for ease in packing and shipping.

Plates 119 are attached to bar 75 by means of dowel pins 120 and 121. Bar 80 rests on the forward plate 119 with dowel 120 passing through a selected aperture 114. Disengagement of the bars and dowels is prevented by clips 122 and 123.

The indicating assemblies are attached to bar 74 by dowel pin 124. The threaded pin 124 is engaged in the indicating assemblies and passes through suitable apertures in bar 74 with a plate 118 interposed between the indicating assembly and parallel bar 74.

With reference to Figs. 1 and 3, parallel bar 74 is supported on main frame 10 by C clamps 126 and 127 and maintained absolutely parallel to the wheel of the vehicle by spacers of preselected length 128, one end of which is partially cut away at 129 to rest on and contact the tire bead 130. The opposite end 131 is an abutment for parallel bar 74. The spacers 128 are slidably positioned relative to the main frame 10 and the parallel bar 74 by means of the members 132 each of which has a substantially U-shaped portion 133, with the free end of one of the legs 134 being upwardly bent at 135. The spacers 128 are each engaged in a threaded aperture in one of the upstanding ends 135. The U-shaped portion 133 slidably embraces one of the bars 13, 25 and C-clamps 126, 127 clamp the bar 74 and members 132 to the main frame.

My measuring chart 93 is printed with an arrow 136 marked "in" and an arrow 137 marked "out." As disclosed in Figs. 6 and 13, my chart is six inches long and each inch and half inch is indicated by a vertical line and each inch vertical is provided with a numeral. There are nine parallel, horizontal lines defining eight spaces of 3/16 of an inch each. A diagonal line is drawn from the point where the inch and one-half inch vertical lines intersect the top horizontal line to the point of intersection of the next vertical line with the lowermost horizontal line. Therefore, wherever a diagonal crosses the center horizontal line it divides the half inch into halves of one-quarter each. It will be noted by following any diagonal line from top to bottom horizontal line that each horizontal line that is crossed adds another one-sixteenth of an inch. As a vertically disposed hair line indicator moves over the measuring chart, its position may be read with complete accuracy to the thirty-second part of an inch.

For calibrating the indicating means, I have provided a pair of calibrating bars 138 and 139 of predetermined length adapted to be positioned between the bars 74 and 75. Each bar has its ends provided with elements 140. Each element 140 has the main portion thereof secured to the calibrated bar by rivets 141 or the like. The outer free end of each element 140 is downwardly angulated at 142 and a thumbscrew 143 is threadedly engaged therethrough for clampingly holding the bars 74 and 75 against the ends of the calibrating bars 138 and 139. When the bars 74 and 75 are set in their parallel relationship, the hairlines on the indicators can be set in relation to the charts or cards 93, and the cards fixed in position by their screws.

Thereafter, the first and second indicating means can be employed in alignment of various makes of vehicles with their varying transverse dimensions. The openings 114 in the bars 80 are jig drilled for accuracy and in order to obviate the necessity of recalibration for use on the different makes of vehicles.

*Operation*

In order to obtain proper wheel alignment, it is first necessary to test the jacked-up wheel for run-out or wobble. The wheel is raised so as to be freely rotated and my steering degree indicator 54 is placed adjacent the wheel with the adjustable contact rod 66 bearing against the tire rim bead, as shown in Fig. 14. With the adjustable contact rod 66 bearing against the bead and the pointer resting at zero, the wheel is slowly rotated. As the wheel rotates, any wobble inherent therein will be indicated by the action of the pointer 55, relative to the scale 56 of the steering degree indicator. After both the right and left steering wheels have been tested in this manner and the wobble, if present, corrected, the vehicle is situated on a floor which is known to be level.

The steering wheels are set in a substantially straight-ahead position by manipulation of the driver's hand steering wheel. It will, of course, be understood that perfect straight-ahead positioning of the steering wheels is not requisite to proper utilization of the apparatus of my present invention.

Next, the main support frame 10 is positioned at the proper height relative to the vehicle wheel by means of the pins 44 which have been placed in the proper apertures in the supports 40 and 41. The main support frame 10 rests on the pins 44 between the upright portions of the supports 40 and 41. With the supports in place, the arrow 39 is positioned at the vertical center line of the vehicle wheel with the claw portions of the clamps 45 and 46 engaging the rear wall of the tire. The rods 51 are then pivoted to position the claws and the thumb nuts 50 are rotated, drawing the main support frame 10 to the vehicle wheel for rigid attachment thereto. After the main support frame 10 has been securely fastened to the vehicle wheel, the supports 40 and 41 may be removed.

The steering angle indicator 54 is placed to the side of the wheel outwardly of my camber-caster device 152, with the pivot point of the indicator in line with the arrow 39, the indicator housing being aligned with the center of the wheel. The operating arm 64 is perpendicularly related to the slide bar 34. Next the cross-sectional diameter of the tire is determined and the slide bar 34 graduation is set to the numeral on the slide bar corresponding to the cross-sectional diameter of the tire. This is necessary in order that dowel pin 87 carried by slide bar 34 will, with the wheel spindle bolt, define a line parallel to the support assembly (see Fig. 12). Then select an aperture 73 in the conecting link 69 having the same numeral as that to which the slide bar is set and in that hole the dowel pin 65 of the actuating arm 64 is positioned, with the aperture at the opposite end of link 69 resting over the dowel pin 87 of the slide bar 34. With the link 69 in place and the steering wheels set substantially straight-ahead, the linkage and indicator are adjusted so as to render the elements in perpendicular relation to each other with the pointer housing aligned with the center of the wheel and the pointer 55 on "Zero."

The camber and caster of the wheels may now be tested by such means as I have disclosed and claimed in my copending application Ser. No. 214,114, filed March 6, 1951, now Patent No. 2,627,123.

After having tested for wheel-run-out or wobble and corrected same and with the main support frame 10 firmly clamped to the tires of the wheels to be tested, the two elongated bars 74 and 75 are clamped to the main support frame in the following manner. The bar 74 is placed over two spacer carriers 132 which are slipped over the upper members 11 and 25 of the main support frame and slid along the upper members of the main support frame until each spacer 128 is in contact with the bead flange 130 of the tire. One edge of the parallel straight edge 74 is held in contact with both of the spacers 128. While the parallel straight edge 74 is firmly held in contact with the spacers, C-clamps 126 and 127 (see Fig. 3) are placed over the straight edge 74, the spacer carrier 132 and the upper bars of the main support frame, the screw is tightened securely, fastening these members together so that the end of the bar 74 is at the C-clamp 126. In this manner, the parallel straight edge is securely held absolutely parallel to the plane of the tire rim bead and is fixedly related to the spindle bolt for the wheel to which it is secured. It must be remembered that parallel straight edge 75 is attached to the other wheel of the vehicle in the same manner. With both the parallel straight edges properly located, the first or prime indicating assembly 76 is attached to the outer ends of the bars 74 and 75. The prime indicating assembly is attached to the bar 74 by means of dowel pin 88 and by sliding the bars 80 and 81 of the prime indicating assembly relative to each other, the indicator is located midway of the chart plate 79 and the appropriate aperture 114 placed over the dowel pin 120 of the bar 75. The tie clip 122 is moved into clamping engagement with plate 119 to prevent disengagement of the indicating assembly from the parallel straight edge 75. The adjustable caster support 150 is adjusted in order to maintain the prime indicating assembly at the proper height. The second sub indicating assembly may now be attached to the bars 74 and 75 in a similar manner to that described for the prime indicating assembly.

If the wheels of the vehicle are in proper alignment, that is, no toe-out or toe-in present, the measuring indicators of both the prime and sub indicating assemblies will give an identical reading. However, if the wheels are out of alignment, there will be a difference in this reading, for, as it may be understood, the prime indicating assembly which is a greater distance out on the bars from the vehicle wheels, will give an amplified indication of a greater degree than that of the sub indicating assembly which is relatively close to the vehicle wheels. Obviously, by projecting the two parallel straight edges a considerable distance forward of the wheel axis, minor measurement errors, which cannot be overcome when measuring between the wheels alone, become greatly amplified.

With my device, it is only necessary that the mechanic first adjust the steering wheels to a slight toe-out condition and then adjust back to a perfect alignment condition in which the indicators of the prime and sub indicating assemblies are the same. This procedure takes care of the usual yield present in steering wheels which would normally tend to cause a toe-out condition.

Vehicles provided with independent spring suspension systems (knee-action), present a problem if a faulty angular relation exists in this suspension. When my invention has been assembled on a vehicle provided with independent suspension, the adjustable indicators are moved so as to contact indicator 104. A weight approximating that which will normally be carried by the front seat of the vehicle is placed therein and any change in the relative positions of the before-mentioned indicators noted. If there is a change in the relative position of the indicators, faulty angular relation of the independent suspension mechanism exists. Therefore, the alignment procedure should be carried out with the appropriate weight in the vehicle or the faulty condition of the suspension mechanism should be corrected.

It will, of course, be understood that the steering angle indicating device may be employed by applying one device to each of the steering wheels of a vehicle. The steering wheels may then be turned and readings of the two indicators compared and tabulated, mechanical corrections being made as required.

The apparatus of the present invention may be employed with the camber caster device designated generally by the numeral 152 and disclosed in detail and claimed in copending application Ser. No. 214,114, now Patent 2,627,123, and the tabulated results therefrom may be applied to the interpreter of my copending application Ser. No. 214,115, filed March 6, 1951, now Patent 2,641,851.

It will be understood that various modifications and mechanical substitutions can be made without departing from the real spirit and scope of my invention, as defined in the appended claims.

Having thus defined my invention, what I claim is:

1. A frame assembly for supporting steering wheel alignment apparatus, said assembly comprising spaced portions each including upper and lower bars joined in spared parallel relationship and providing parallel upper and lower contact edges for abutment against the outer side of a tire, and clamping means slidably carried by a bar of each of said portions and adapted for cooperative engagement with the tire for clampingly maintaining the assembly in stable relation to the tire.

2. A frame assembly for supporting steering wheel alignment apparatus, said assembly comprising spaced portions each including upper and lower bars joined in spaced parallel relationship and providing parallel upper and lower contact edges for abutment against the outer side of a tire, removable support means for preliminarily supporting said assembly in selected parallel relationship with the supporting surface for the tire, and clamping means slidably carried by a bar of each of said portions and adapted for cooperative engagement with the tire for clampingly maintaining the assembly in stable relation to the tire.

3. A frame assembly for supporting steering wheel alignment apparatus, said assembly comprising spaced portions each including upper and lower bars joined in spaced parallel relationship and providing parallel upper and lower contact edges for abutment against the outer side of a tire, and clamping means adjustably carried by each of said portions and adapted for cooperative engagement with the tire for clampingly maintaining the assembly in stable relation to the tire, said clamping means including a slidable carrier on a bar of each of said portions, a tire claw swivelly mounted on each carrier, a relator rod correlated with the positioning of the claw so as to indicate when the claw is located for engagement with the side of the tire opposite the supporting portion in a plane passing between the upper and lower bars of the portion, and means for clamping urging each tire claw into clamping engagement with the tire.

4. A frame assembly for supporting steering wheel alignment apparatus, said assembly comprising spaced portions each including upper and lower bars joined in spaced parallel relationship and providing parallel upper and lower contact edges for abutment against the outer side of a tire, and clamping means adjustably carried by each of said portions and adapted for cooperative engagement with the tire for clampingly maintaining the assembly in stable relation to the tire, an elongated bar mounted on said support assembly, spacers of preselected length disposed between said elongate bar and the bead of the tire rim, and means for maintaining said elongated bar, support assembly and spacers in selected relationship such that said elongated bar is disposed parallel to the plane of the tire rim bead.

5. The invention according to claim 1, with a spacer unit carried by a bar of each portion for engagement with the tire bead for spacing an element of alignment apparatus parallel to the plane of said bead.

6. For checking alignment of vehicle steering wheels, a pair of elongate straight-edge bars, means for horizontally securing each bar at one end upon the outer side of a wheel in a plane parallel with the plane of the tire bead to extend forwardly from the wheel, an elongate coupling member between and extending across the forward end portions of said bars, a second elongate coupling member between and extending across said bars a substantial distance inwardly from the first member, each of said members comprising two sections one extending the full width of the space between said bars and at one end overlying the other section, means slidably connecting the said sections together for facilitating changing the length of the member, means coupling the outer end of the under one of said sections to the adjacent bar, means for coupling the outer end portion of the upper section to the adjacent bar for limited longitudinal adjustment transversely of the latter bar, an elongate chart, means supporting the chart on and for adjustment longitudinally of said upper one of said sections, and an indicator carried by and secured to said under section and cooperatively related to the chart for indicating correct relationship between said bars when said wheels are in proper alignment.

7. The invention according to claim 6, wherein said chart supporting means comprises an elongate plate having means along its longitudinal edges forming cooperatting guides in which the chart is held, and means attaching the ends of the plate to said one section for adjusting the plate longitudinally of and on the said one section.

8. The invention according to claim 6, wherein said indicator is secured to said under section and includes two spaced portions projecting forwardly beyond the face of said chart and a wire secured between said portions and lying across the face of the chart for coaction with indicia thereon.

9. The invention according to claim 6, wherein said indicator includes a wire lying across the face of the chart for coaction with indicia thereon, and two auxiliary indicators carried by the chart, one on each side of the fixed indicator and shiftable for manual setting with respect to said wire of the fixed indicator.

References Cited in the file of this patent

UNITED STATES PATENTS

| 1,449,289 | King | Mar. 20, 1923 |
| 1,829,133 | Frykman | Oct. 27, 1931 |
| 1,992,521 | Creagmile | Feb. 26, 1935 |
| 2,115,766 | Graham | May 3, 1938 |
| 2,190,709 | Friestedt | Feb. 20, 1940 |
| 2,281,197 | Martin | Apr. 28, 1942 |
| 2,434,205 | Fields | Jan. 6, 1948 |
| 2,522,066 | Smith | Sept. 12, 1950 |
| 2,532,593 | Bender | Dec. 5, 1950 |
| 2,612,703 | Castiglia | Oct. 7, 1952 |
| 2,624,123 | Wilkerson | Jan. 6, 1953 |

FOREIGN PATENTS

| 130,331 | Australia | Nov. 29, 1948 |

OTHER REFERENCES

Bender publication, "Wheel Alignment Checking Unit," J. H. Bender Equipment Co., South Gate, California (4 pages), received in Patent Office April 6, 1949.